Nov. 4, 1969     M. J. BLICKSTEIN ET AL     3,476,994

VARIABLE CAPACITOR

Filed June 5, 1967     2 Sheets-Sheet 1

INVENTORS
MARTIN J. BLICKSTEIN
MARTIN A. MITTLER

BY Burgess, Dinklage & Sprung

ATTORNEYS.

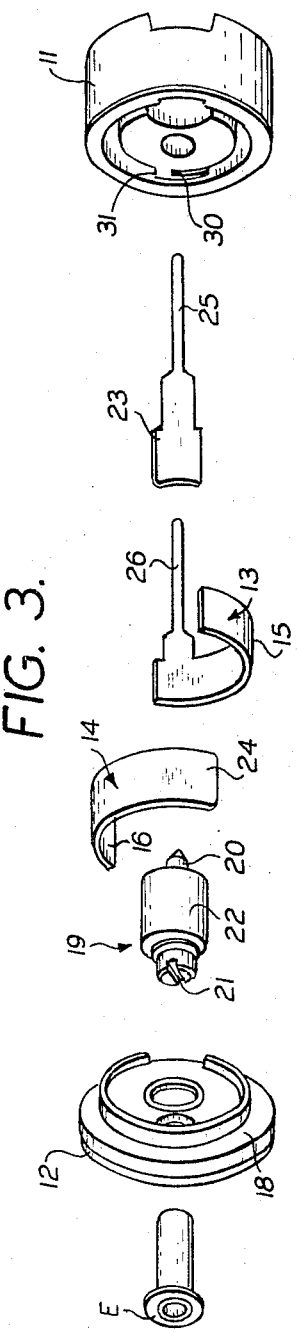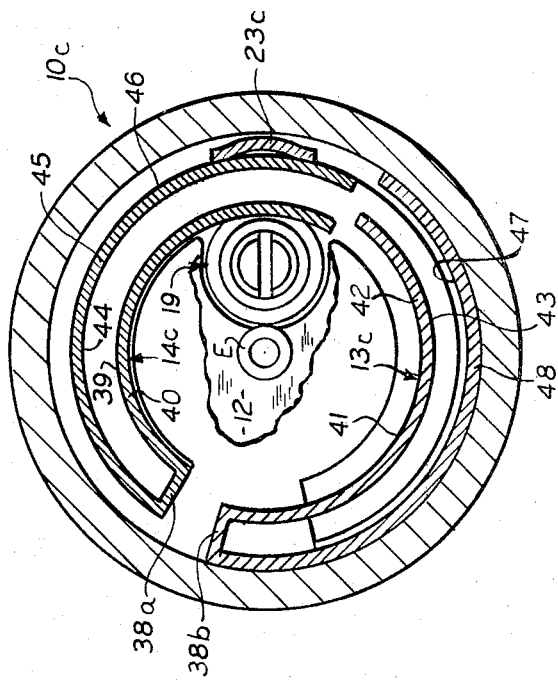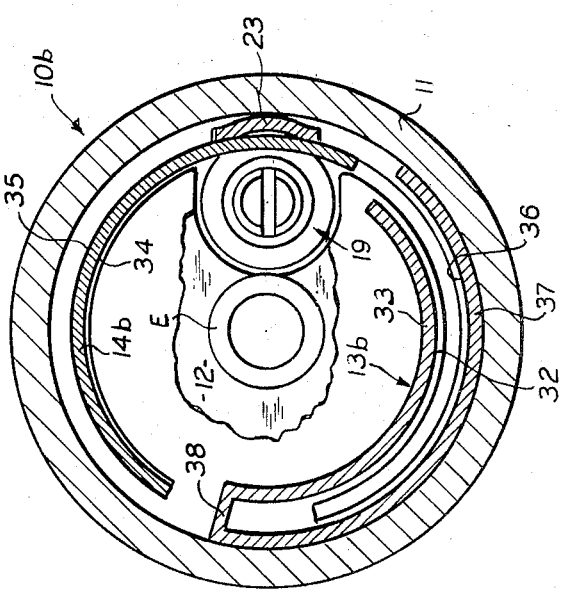

United States Patent Office 3,476,994
Patented Nov. 4, 1969

3,476,994
VARIABLE CAPACITOR
Martin J. Blickstein, West Caldwell, and Martin A. Mittler, Parsippany, N.J., assignors to Voltronics Corporation, Hanover, N.J., a corporation of New Jersey
Filed June 5, 1967, Ser. No. 643,547
Int. Cl. H01g 5/01
U.S. Cl. 317—253
9 Claims

ABSTRACT OF THE DISCLOSURE

A variable capacitor in which the stator and rotor plate elements are cylindrical segment sheets concentrically arranged and wherein the rotor is driven by an eccentric shaft means for rotation reative to the stator to vary the electrical capacitance established therebetween.

---

The present invention relates to a variable capacitor in which the rotor and stator plate elements have a cylindrical segment configuration and are concentrically arranged for relative rotary movement about a common axis.

With such a rotor and stator plate arrangement, the electrical capacitance which they establish for a given spacing and dielectric constant will be proportional to their mutually projected area, i.e. circumferential overlap area, and hence proportional to the angular position of the rotor plate relative to the stator plate.

For a given diameter dimension limitation, the capacitor configuration of the invention affords a greater maximum-to-minimum capacitance ratio as well as a higher maximum capacitance, as compared to the conventional semicircular rotor and stator plate configuration.

Since the relative movement between the rotor and stator plates in the variable capacitor of the invention is confined to a fixed axial zone along their axis of concentricity, the capacitor of the invention can be of smaller axial length than an equivalent variable capacitor having axially moveable plates of concentric tabular configuration.

According to a preferred embodiment of the invention the stator plate is defined by an electrically conductive member having a cylindrical segment surface, which member can be either a solid metallic member or a metallic sheet supported by an insulator. The rotor plate is defined by another electrically conductive member, preferably a metallic sheet, which is concentric with the stator plate surface, and rotatable relative thereto about the axis of concentricity. For maximum compactness, both the stator plate surface and the rotor plate sheet are approximately semi-cylindrical, although either can have a cylindrical surface extending for more or less than exactly 180 degrees, depending upon the maximum and minimum capacitances desired and whether or not maximum and/or minimum capacitance is to be achieved over a finite portion of the rotor plate rotation range.

The stator plate member is fixedly supported by an insulated base means which also has guides disposed for engagement with the rotor plate member to constrain the rotary movement thereof along a circular path concentric with the common axis. To limit the rotary displacement of the rotor plate member, the base means has parts defining mechanical stops which engage the rotor plate member at each of two opposite extreme angular positions, corresponding to the positions of maximum and minimum capacitance.

For connection to an external circuit, the stator plate member presents no significant problem by reason of its stationary relation to the base means, and any conventional lead connection means, such as a lug affixed to the stator plate member, or a screw terminal, wire, etc. can be used for such purpose.

For connecting the rotor plate member to an external circuit, the invention provides an electrically conductive means fixedly supported by the base means and disposed for wiping contact engagement with the rotor plate member throughout its entire range of motion.

Such electrically conductive means is expediently in the form of a metallic wiper having a lug or other lead means extending through the base means.

Rotation of the rotor plate member relative to the stator plate member can be accomplished by any one of a variety of capacitance adjustment means contemplated by the invention. In view of the fact that the rotor plate member is a cylindrical segment which is to swing at its own radius about the axis of concentricity and in parallel relation thereto, such rotor plate member can be rotatably driven by a shaft means which is supported by the base means for rotation relative thereto about an axis eccentrically located with respect to the axis of concentricity.

Such shaft means can be expediently in the form of a roller mounted on a shaft provided at one end with a slot to receive a screwdriver blade for turning thereby, the roller being positioned for rolling contact engagement with the rotor plate member cylindrical surface. With such a shaft means, the frictional rolling contact of the roller with the rotor plate member is used to impart rotary motion thereto, and with reasonably sufficient contact pressures, such an arrangement affords a high degree of capacitance setting repeatability.

However, if a positive displacement type of rotor plate member adjustment is desired, this can be readily obtained by providing the rotor plate member with a series of circumferentially spaced indentations or perforations, and by substituting a toothed pinion, or sprocket wheel for the roller, the teeth of such pinion or wheel being arranged for meshing engagement with the rotor plate member indentations.

While by using a metallic drive shaft means, a reasonably good electrical contact with the rotor plate member can be maintained, it is advantageous even in such case to use a conductive wiper. According to the invention, the drive shaft means is arranged for engagement with one side of the rotor plate member and the wiper element is arranged for contact with the opposite side thereof, so that the thickness of the rotor plate member passes between the drive shaft means and wiper element. In this way the rotor plate element cannot escape contact with either the drive shaft means or the wiper element and both highly reliable electrical contact and rotor driving is assured.

With an eccentrically located drive shaft means, the diameter of the roller or pinion which engages the rotor plate member is necessarily smaller than the diameter of the cylindrical surface thereof, a feature which means that to effect a given rotor plate member angular displacement, a greater angular displacement of the drive shaft means is required, the exact ratio of the two displacement angles depending upon the specific roller or pinion-to-rotor plate surface diameter ratio. Accordingly, with the construction of the invention, such diameter ratio can be made high enough so that several complete drive shaft rotations are required to cover the entire rotation range of the rotor plate member, a feature which raises the degree of capacitance adjustment precision.

The invention is not necessarily limited to capacitor constructions having only a single active rotor plate surface and a single active stator plate surface, but can be adapted for multiple stator and rotor plate configurations as well. For example, the stator element can be made in the form of a plurality of concentric, radially spaced apart conductive sheets of cylindrical segment configuration and electrically connected together as by a common bus bar or end plate. The rotor element can be likewise made of a plurality of concentric cylindrical segment sheets radially spaced apart so as to slip in between the spaces of adjacent stator sheets when the assembled rotor element is rotated by a drive shaft means that engages either the outermost rotor sheet or the innermost thereof.

It is therefore an object of the invention to provide a variable capacitor having cylindrical surfaced rotor plate and stator plate elements.

Another object of the invention is to provide a variable capacitor wherein the angular displacement of the capacitance adjustment means is greater than the angular displacement of the rotor plate element for a given change in capacitance settings.

A further object of the invention is to provide a variable capacitor as aforesaid, wherein relatively high maximum capacitance can be achieved within a compact volume.

A further object of the invention is to provide a variable capacitor as aforesaid which affords a relatively high ratio of maximum to minimum capacitance.

Still another and further object of the invention is to provide a variable capacitor as aforesaid which is adaptable to construction in embodiments having a plurality of rotor and stator plate surfaces.

Other and further objects and advantages of the invention will become apparent from the following detailed description and accompanying drawing in which:

FIG. 3 is an exploded perspective view of the variable capacitor shown in FIGS. 1 and 2.

FIG. 6 is an end view, partly in section, of a variable capacitor according to the invention which features a double-sheet stator plate element in combination with a single-sheet plate element.

FIG. 7 is an end view, partly in section, of a variable capacitor according to the invention which features a double-sheet stator plate element in combination with a double-sheet rotor plate element.

Figure 1:
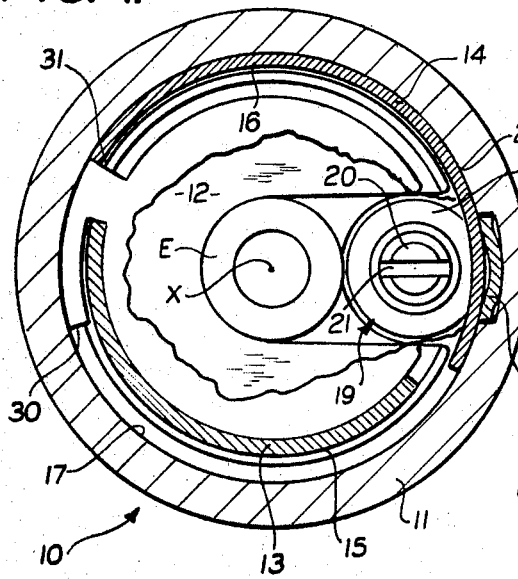
FIG. 1 is an end view, partly in section, of a variable capacitor according to a preferred embodiment of the invention.
Figure 2:
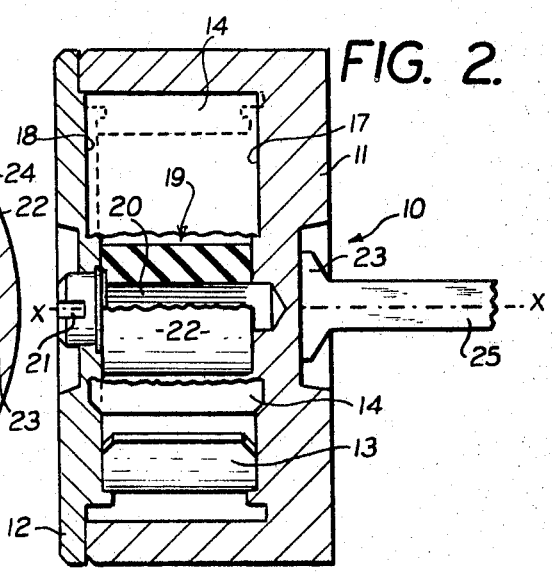
FIG. 2 is a side view, partly in section, of the variable capacitor shown in FIG. 1.

Referring now to FIGS. 1–4, the invention provides a variable capacitor 10 which is assembled within a generally cylindrical case 11 having an end cover 12 which cooperate to define a base means for the capacitor 10, which case and cover 12 are secured together by an eyelet E, or equivalent fastening means.

The electrical capacitance of capacitor 10 is established by a stator plate element 13 in the form of a cylindrical segment sheet of conductive material, and a rotor plate element 14 also in the form of a cylindrical segment sheet of conductive material. In the particular embodiment exemplified by FIGS. 1–4, only the outer surface 15 of stator 13 and inner surface 16 of rotor 14 are effective to establish electrical capacitance, and stator 13 and rotor 14 are disposed so that surfaces 15 and 16 are generally concentric with respect to a common axis X, and are in electrically insulated radially spaced-apart relation to each other.

The case 11 and cover 12 have respectively a guide wall 17 and a groove 18 which engage the edges of the rotor 14 to guide the movement thereof along a circular path of constant radius and concentric with axis X so that rotor 14 can be rotatably positioned about axis X relative to stator 13 to selectively vary their mutually projected area, i.e. circumferential overlap area, and hence the value of capacitance which they establish. This capacitance value is therefore dependent upon the angular position of rotor 14 with respect to stator 13, and is adjusted by a rotatable drive shaft means 19 which engages rotor 14 to rotatably position same about axis X.

Drive shaft means 19 expediently is in the form of a shaft 20 supported by case 11 and cover 12 for rotation relative thereto, as, for example, by a screwdriver blade (not shown) inserted into a slot 21 provided on the end of shaft 20, and a roller 22 mounted on shaft 20. Roller 22 can be of any suitable material, either electrically conductive or non-conductive, and is disposed for rolling contact engagement with rotor 14 to rotate same about axis X when shaft 20 is turned. As can be noted from FIG. 1, shaft 20 is eccentrically located with respect to axis X and is preferably parallel thereto. The radial distance of shaft 20 from axis X is chosen such that for the roller 22 diameter used, a sufficiently high contact pressure exists between said roller 22 and the inside surface 16 of rotor 14 to assure a reliable rolling contact drive friction. A metallic wiper 23, somewhat buckle-shaped is supported by case 11 for wiping contact engagement with the outer surface 24 of rotor 14, said wiper 23 having a lug 25 extending from cage 11 for connection to an external circuit (not shown), just as stator 13 has a similar lug 26 extending from case 11 for the same purpose. Wiper 23, in addition to serving as a means for maintaining electrical contact with the moveable rotor 14, also serves to constrain said rotor 14 for movement by rolling contact with roller 22.

Figure 4:
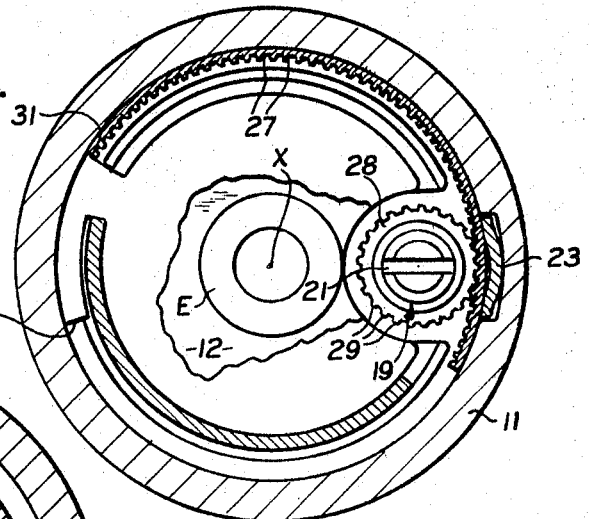
FIG. 4 is an end view, partly in section, of a variable capacitor according to another embodiment of the invention, and differs from that shown in FIG. 1 by the inclusion of a positive displacement drive means.

If a positive displacement type driving of rotor 14 should be desired, this can be readily accomplished as illustrated in FIG. 4 by providing rotor 14 with a series of circumferentially spaced indentations 27 (which can actually be perforations with negligible loss of capacitance) and by substituting a pinion 28 for roller 22, which pinion has teeth 29 arranged for meshing engagement with the rotor 14 indentations 27.

Where an electrically conductive roller 22 or pinion 28 is used, wiper 23 is preferably connected electrically to such roller 22 or pinion to further reduce any contact resistance as would exist between wiper 23 and rotor 14 alone.

While the guide wall 17 and groove 18 serve to guide the movement of rotor 14 along a circular path concentric with axis X, it is desirable that the motion of said rotor 14 be confined between two extreme angular positions $\theta_{max}$ and $\theta_{min}$ along such path, which limit positions $\theta_{max}$, $\theta_{min}$ correspond respectively to maximum and minimum capacitance values. This is accomplished by mechanical stop parts 30 and 31 integrally constructed with case 11, the part 30 being positioned to establish the maximum capacitance angular position $\theta_{max.}$, and the part 31 being positioned to establish the minimum capacitance angular position $\theta_{min}$.

From FIG. 1 it can be noted that both the rotor 14 and stator 13 extend over a cylindrical segment angle of approximately 180 degrees and the angular travel range, $\theta_{min}$ to $\theta_{max}$, of rotor 14 is slightly less than 180 degrees. While rotor 14 travels about 180 degrees with respect to axis X in going from its minimum capacitance setting $\theta_{min}$ to its maximum capacitance setting $\theta_{max}$, the roller 22 or pinion 28 used to drive said rotor 14, necessarily turns considerably more than 180 degrees to cover the full capacitance range, a feature which gives capacitor 10 the same degree of capacitance adjustment precision as is obtainable from multi-turn variable capacitors (not shown). In any particular construction of capacitor 10, the degree of adjustment precision will be dependent upon the diameter ratio of the rotor 14 and drive roller 22 or pinion 28.

Figure 5:
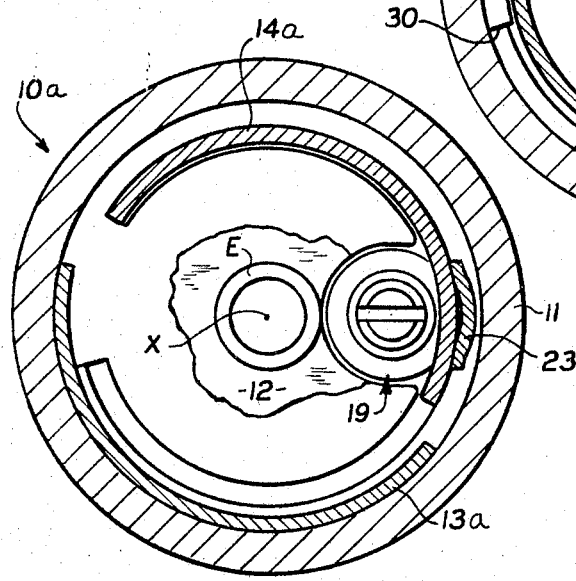
FIG. 5 is an end view, partly in section, of a variable capacitor according to a further embodiment of the invention, and which is an inside-out version of the capacitor shown in FIG. 1.

FIG. 5 serves to illustrate that the invention is not necessarily restricted to embodiments wherein the stator 13 diameter is less than the rotor 14 diameter, and as illustrated thereby, a variable capacitor 10a which is an inside-out version of capacitor 10 can be constructed simply by using a stator 13a greater in diameter than rotor 14a such that said rotor 14a will move along a circular arc path inside of stator 13a, to effect the same result.

As exemplified by FIGS. 6 and 7, the invention is not restricted to embodiments wherein the variable electrical capacitance is established by a single pair of conductive surfaces 15 and 16 as in the FIG. 1 embodiment.

For example, the variable capacitor 10b of FIG. 6 has a double-sheet stator 13b and a single-sheet rotor 14b to provide double the capacitance obtainable with its FIG. 1 or FIG. 5 counterpart. In capacitor 10b, the effective electrical capacitance is established by the sum of the mutually projected area of the outer surface 32 of the inner stator cylindrical segment sheet 33, and the inner surface 34 of rotor 14b, plus the mutually projected area of the outer surface 35 of rotor 14b and the inner surface 36 of the outer stator cylindrical segment sheet 37, said inner and outer stator sheets 33 and 37 being electrically connected together by an end bridge part 38, and radially spaced apart to allow insertion of rotor 14b with such clearance as is desired for whatever air dielectric thickness is to be provided.

The variable capacitor 10c of FIG. 7 has both a double-sheet stator 13c and a double-sheet rotor 14c to provide substantially triple the capacitance obtainable with the FIG. 1 capacitor 10 for similar dimensions. In capacitor 10c, the total effective electrical capacitance is the sum of the three individual capacitances established (1) by the outer surface 39 of the inner rotor sheet 40 and the inner surface 41 of the inner stator sheet 42, (2) by the outer surface 43 of the inner stator sheet 42 and the inner surface 44 of the outer rotor sheet 45, and (3) by the outer surface 46 of outer rotor sheet 45 and the inner surface 47 of the outer stator sheet 48.

From the foregoing, it should be understood that multiple sheet rotor and stator elements of more than two cylindrical segment sheets can be used to construct variable capacitors in accordance with the invention having higher inherent capacitance ranges. In such constructions, all of the rotor sheets are electrically connected together, as are all of the stator sheets, which connections can be accomplished by conductive bridge parts 38a and 38b as illustrated in FIG. 7.

As to the driving of such multiple-sheet rotors 14c, the same type of eccentrically located driev shaft means can be employed as for the basic capacitor 10 of FIG. 1, with similar rotor guidance means being provided in the case 11. Likewise, the same type of rotor wiper contact arrangement can be used for multiple-sheet rotors 14c as used for the single-sheet rotor 14, except that such wiper 23c can be expediently positioned for wiping contact engagement with the outermost rotor sheet 45.

Throughout the several embodiments of the invention hereinbefore described, the rotor sheets and stator sheets which establish the net effective capacitance are radially spaced apart from one another, such spaces being expediently air spaces to provide the necessary dielectric. However, the same spaces can be filled with some other insulating material, which can be supported by the case 11, or applied as a coating to the rotor and stator sheets to provide a higher dielectric constant for higher capacitance, if desired. Such additional dielectric, of course is so supported as not to interfere with the movement of the rotor structure relative to the stator structure.

As will be appreciated by the artisan from the foregoing description of the invention, a variety of variable capacitor constructions can be achieved through obvious modifications of those described herein by way of example. However, the invention is intended to be limited only by the following claims in which we have endeavored to claim all inherent novelty.

What is claimed is:

1. A variable capacitor which comprises a first electrically conductive member having a cylindrical segment surface, a second electrically conductive member having a cylindrical segment surface substantially concentric with the cylindrical segment surface of said first member and disposed in electrically insulated spaced-apart relation thereto, and an electrically conductive wiper means in physical and electrical contact with at least a portion of the outside surface of said second electrically conductive member, and means electrically insulated from said second member for rotating said second member relative to said first member about their axis of concentricity to selectively vary the angular position about said axis of said second member cylindrical surface relative to said first member cylindrical surface to correspondingly vary the electrical capacitance established by said first and second members.

2. The variable capacitor according to claim 1 including a base means for supporting said first and second conductive members and said rotating means, said base means having guide means disposed for engagement with said second member to guide the rotary movement thereof along a circular path concentric with said axis.

3. The variable capacitor according to claim 2 including electrically conductive means fixedly supported by said base means and disposed for wiping contact engagement with said second member, and for connection to an external circuit to define a stationary electrically conductive connection between such circuit and said moveable second member.

4. The variable capacitor according to claim 3 wherein said second member rotating means includes a shaft means supported by said base means for rotation relative thereto and disposed for engagement with said second member to rotate same about said axis and thereby vary the capacitance established by said first and second members.

5. The variable capacitor according to claim 4 wherein said shaft means includes a roller disposed for rolling contact engagement with the cylindrical surface of said second member.

6. The variable capacitor according to claim 4 wherein said second member has a plurality of indentations arranged circumferentially along its cylindrical surface, and said shaft means includes a pinion having teeth disposed for meshing engagement with said indentations.

7. The variable capacitor according to claim 4 wherein said base means has parts disposed for engagement with said second member at each of two extreme angular positions along the path of rotary movement thereof to limit the available capacitance variation to a range having a minimum capacitance value corresponding to one of said extreme angular positions, and a maximum capacitance value corresponding to the other of said extreme angular positions.

8. The variable capacitor according to claim 4 wherein one of said first and second members has a plurality of concentric, radially spaced-apart electrically conductive sheets of cylindrical segment configuration electrically connected together, and the other of said first and second members has an electrically conductive cylindrical segment sheet arranged for insertion between a pair of adjacent radially spaced-apart sheets of said plurality thereof when said first and second members are rotated relative to each other about said axis of concentricity.

9. The variable capacitor according to claim 4 wherein said first and second members each have a plurality of concentric, radially spaced-apart electrically conductive sheets of cylindrical segment configuration electrically connected together, to define respectively a multi-sheet stator and a multi-sheet rotor, the sheets of said stator and rotor being arranged for insertion of the rotor sheets between corresponding pairs of adjacent stator sheets when said first and second members are rotated relative to each other about said axis of concentricity.

References Cited

UNITED STATES PATENTS

| | | | |
|---|---|---|---|
| 1,652,863 | 12/1927 | Kent | 317—253 |
| 1,673,005 | 6/1928 | Gargan | 317—253 |
| 2,533,730 | 12/1950 | Gersch | 317—253 |
| 2,558,925 | 7/1951 | Bowman | 317—249 X |
| 3,306,875 | 2/1967 | Hay. | |
| 3,360,757 | 12/1967 | Wahlberg | 317—253 X |

FOREIGN PATENTS

| | | |
|---|---|---|
| 251,049 | 4/1926 | Great Britain. |
| 738,669 | 10/1932 | France. |
| 914,860 | 1/1963 | Great Britain. |

ELLIOT A. GOLDBERG, Primary Examiner

U.S. Cl. X.R.

317—255